Patented June 5, 1945

2,377,753

UNITED STATES PATENT OFFICE 2,377,753

PROCESS FOR PRODUCING ETHYLENE POLYMERS

Merlin Martin Brubaker, Boothwyn, Pa., assignor to E. I. du Pont de Nemours & Company, Wilmington, Del., a corporation of Delaware No Drawing. Application January 30, 1943, Serial No. 474,168

21 Claims. (Cl. 260—86)

This invention relates to ethylene polymers and more specifically to polymers of ethylene with polymerizable organic sulfur-containing esters.

It is an object of this invention to prepare new polymers of ethylene. A further object of this invention is to prepare new polymers of ethylene and vinyl thiol esters of organic acids. Yet another object of this invention is to prepare polymers of ethylene which can further be converted into an insoluble and infusible form. Another object is to prepare polymers of ethylene with a vinyl thiol ester of a lower aliphatic carboxylic acid. It is still a further object to prepare polymers of ethylene with vinyl thiolacetate. Other objects will be apparent hereinafter.

These objects are realized in accordance with this invention wherein ethylene is polymerized together with a vinyl thiolester of an organic carboxylic acid.

In accordance with the present invention, a polymer of ethylene with a vinyl thiolester of an organic carboxylic acid is prepared by subjecting an intimate mixture of ethylene and the vinyl thiolester of an organic carboxylic acid to polymerizing conditions, i. e., to a temperature of at least 20° C. in the presence of a per-oxy compound catalyst and a normally liquid, non-polymerizable substance, under a superatmospheric pressure.

In one modification of the present invention, a minor amount of a third polymerizable organic compound containing ethylenic unsaturation can be included in the reaction mixture. Suitable examples of such compounds are styrene, vinyl chloride, vinyl acetate, vinyl dimethyl and trimethyl acetates, vinyl hexenoate, vinyl esters of thiophene-1-carboxylic acid, vinyl picolinate, vinyl ketones, e. g., methyl vinyl ketone; acrylic and methacrylic acids, their esters, amides, and nitriles, etc.; vinylidene chloride, tetrafluoroethylene, etc.; propylene, isobutylene, etc. Mixtures of such compounds can also be employed.

The term "polymer" is used herein and in the claims to refer to the products obtained by polymerizing ethylene with (1) a vinyl thiolester or (2) with a vinyl thiolester and another polymerizable organic compound of the above mentioned type.

The novel polymers of ethylene with organic vinyl thiolesters prepared in accordance with the present invention, range in physical properties from hard, tough, substances to soft, waxy to tacky substances resembling beeswax. In general, the soft waxy polymers are those containing lower amounts of organic vinyl thiolester, while the hard, tough, polymers contain substantially higher amounts of organic vinyl thiolester. In the intermediate ranges of compositions, polymers containing approximately equimolar ratios of ethylene and organic vinyl thiolester have a low softening point and are often soft and tacky at ordinary temperatures.

The vinyl thiolesters of organic acids employed in the present invention are similar in structure to the ordinary well-known vinyl esters of organic acids except that the oxygen atom connecting the vinyl group with the acyl group in the ordinary vinyl esters is replaced by a divalent sulfur atom. Thus, for example, vinyl thiolacetate can be considered either as the acetyl ester of vinyl mercaptan or as the acetyl thiolic ester of vinyl alcohol. The vinyl thiolesters used in the present invention may be prepared as described in the copending application of M. M. Brubaker, S. N. 269,075, filed April 13, 1939, or by other suitable methods.

Suitable vinyl thiolesters for use in the present invention include vinyl thiolesters of aliphatic, aromatic, araliphatic, cycloaliphatic, and heterocyclic carboxylic acids. The polymerizable vinyl thiolesters of the following organic acids are suitable: formic, acetic, propionic, butyric, glycolic, lactic, hydroxyisobutyric, oxalic, glutaric, adipic, lauric, stearic, ricinoleic, hydroxystearic, and other aliphatic acids as well as benzoic, mandelic, salicylic, phthalic, toluic, hexahydrobenzoic, furoic, thiophene-1-carboxylic, picolinic, phenylacetic, etc. Mixtures of two or more vinyl thiolesters of the above or similar types can also be employed. The polymers of ethylene with the vinyl thiolesters of the lower aliphatic carboxylic acids and especially the polymers of ethylene with vinyl thiolacetate constitute a preferred class within this invention for polymerization with ethylene.

The ethylene employed in the present invention should be of the highest purity practically obtainable. It may, however, contain small quantities of methane, ethane, nitrogen, hydrogen, propane or oxygen. The oxygen content of the ethylene should preferably be reduced to a total content by weight of not more than about 200 parts per million.

As hereinbefore indicated, a minor amount of a third polymerizable component may be employed in preparing polymers of ethylene with organic vinyl thiolesters. Preferably, the third polymerizable component is present in an amount of not more than about 10 mole per cent of the total polymerizable monomers.

The process of this invention is practiced at temperatures in excess of 20° C., generally between 40° C. and 350° C. and preferably between 40° C. and 180° C., and at pressures in excess of atmospheric, preferably in excess of 4 atmospheres, and usually in the range of from about 200 to 1500 atmospheres. In some instances it is desirable to use pressures of 2000 to 3000 atmospheres and over. As a rule the use of high pressures permits the use of lower temperatures. The particular conditions of temperature and pressure preferred in any one case are influenced not only by the nature of the organic vinyl thiolester being polymerized with the ethylene but also by the catalyst used. A wide range of pressure and temperature conditions are operable in this invention, but since these are to a large extent interdependent variables, the optimum conditions for best results in any one instance generally have to be determined experimentally.

In the preparation of polymers of ethylene with a vinyl thiolester of an organic carboxylic acid, it is generally desirable to use a small amount of a per-oxy compound catalyst. By "per-oxy compound" is meant any compound which is capable of inducing vinyl polymerizations and which contains the bivalent radical —O—O—. Examples of such compounds are the alkali metal and ammonium persulfates, perborates, percarbonates, peracetic acid, persuccinic acid, dimethyl dioxide, diethyl dioxide, methyl ethyl dioxide, dipropyl peroxide, acetyl benzoyl peroxide, acetyl peroxide, propionyl peroxide, butyryl peroxide, lauroyl peroxide, benzoyl peroxide, tetralin peroxide, and urea peroxide. The organic per-oxy compounds constitute a preferred class of catalysts for use in this invention. While an excess of catalyst does no particular harm, in general, it has been found that a very small amount of one or more of these per-oxy compound catalysts is entirely adequate in the present invention. Generally speaking, not more than about 5% by weight of the per-oxy compound catalyst is employed, and preferably a much smaller amount within the range of from about 0.001 to 2.0% by weight of catalyst is entirely effective and preferred, the proportions of catalyst being based upon the total weight of monomers present. Mixtures of per-oxy compound catalysts may be employed, and in some cases may be superior to single catalysts. The above catalysts are per-oxy compounds as defined in Webster's International Dictionary for 1935, second edition.

While the polymerization of ethylene with an organic vinyl thiolester may be carried out by simple admixture of the reactants with the catalyst, for physical reasons and in order to insure proper heat transfer, it is preferred to employ as the polymerization menstruum water, benzene, tertiary butyl alcohol, tertiary amyl isooctane, alcohol and the like. The polymerization is most suitably carried out in water because, in general, the reaction is highly exothermic and it is therefore necessary to remove the heat of reaction rapidly, if it is to be kept under control. Because of its high heat capacity, water is an ideal medium for dissipating the heat of reaction, and through its use the necessity for having to provide special means for heat dissipation is avoided, making possible the exercise of closer control of the reaction and leading to products having a high degree of homogeneity. The use of water is particularly advantageous when the reaction is carried out on a large scale, since the possibility of local overheating with resultant damage to the reaction vessel is substantially eliminated.

The ratio of water to reactants can be varied over wide limits, and in some instances it may be desirable to replace at least a part of the water with an organic solvent of the active type, e. g., one which functions both as a diluent and as a reactant, such as, methanol, ketones, acetals, esters, halogenated aliphatic hydrocarbons, e. g., carbon tetrachloride, chloroform, etc.

For operation in an aqueous medium it is not necessary to use dispersing agents but the addition of such substances is sometimes desirable. Suitable examples are starch, the water soluble salts of the higher alkyl sulfates and alkane sulfonates, alkali metal salts of sulfonated mineral oils, and such nonionic water soluble compounds as are obtained by the condensation of several moles of ethylene oxide with long chain amines, alcohols, or acids.

It is often desirable to avoid radical changes in pH during the course of the polymerization. In order to avoid such changes it is advisable, although not essential, to include in the polymerization mixture small amounts of materials which have a buffering action on the pH. Since the polymerization can be carried out satisfactorily in either an acid or an alkaline medium, many types of buffering agents can be used. For example, an alkaline pH can be maintained by the use of such buffers as borax, disodium phosphate, sodium carbonate, ammonium carbonate, sodium acetate, etc. For a pH below 7, such materials as acetic acid, propionic acid, and other organic acids, hydrochloric acid plus potassium chloride, monosodium phosphate, hydrochloric acid plus potassium acid phthalate, sodium hydroxide plus potassium acid phthalate, etc., can be used. In some instances it is desirable to have a low pH, e. g., 2, at the outset or during the reaction, in which case a strong acid such as hydrochloric or sulfuric can be added to the reaction charge in small amounts.

In the practice of this invention it is desirable to use equipment fabricated of or lined with materials which will not rapidly catalyze the decomposition of per-oxy compounds to molecular oxygen. Suitable examples of such materials are stainless steels, silver, tin, aluminum, lead enamel, and glass.

Although equipment fabricated of the above materials is highly desirable, it is not essential since it has been found that so-called mild steels are satisfactory, especially if the vessels have been "conditioned," e. g., by a number of runs or by pretreatment of the apparatus with a warm dilute solution of a peroxide, e.g., hydrogen peroxide.

In practicing this invention as a batch operation, a suitable pressure vessel is charged with the vinyl thiolester of the carboxylic acid and per-oxy compound catalyst. If desired water, or a non-polymerizable, normally liquid organic solvent, or both may be included in the charge. The vessel is then closed, placed in a heated shaker machine, and connected to a source of ethylene. Controlling and recording thermocouples are inserted, ethylene is added to the reaction vessel, and heating and agitation are started. Upon reaching the reaction temperature, or after a period of induction, the reaction starts and is normally followed by a pressure decrease due to utilization of the ethylene. The pressure in the system is maintained throughout the reaction period either by addition of fresh ethylene or organic vinyl thiolester, or a mixture of the two, or by decreasing the free space in the reaction vessel by increasing the volume of the menstruum.

When the reaction is complete, as evidenced by cessation of absorption of ethylene, the vessel is cooled, bled of excess ethylene, opened, and the reaction mixture discharged. The polymer is isolated from the reaction mixture by means known to the art. A further modification of the invention, as previously indicated, includes polymerization of a third polymerizable organic compound with the ethylene and organic vinyl thiolester. The third material can be added with the catalyst and organic vinyl thiolester or, if it is a gas at normal temperatures and pressures, it may be expanded from pressure storage tanks into the closed reaction vessel prior to pressuring with ethylene or added in admixture with the ethylene.

The proportion of organic vinyl thiolester in the polymer can be varied over a wide range. Control of this variable can be effected either by adjusting the amount of organic vinyl thiolester, by varying the ethylene pressure, by varying the ratio of liquid charge to free space in the reactor, or by variation of the choice of the reaction temperature or by combination of these methods.

The following examples illustrate the practice of the invention without limiting it thereto. Parts are by weight unless otherwise designated:

*Example 1.*—A high pressure, stainless steel lined reaction vessel, provided with heating and cooling means, means for agitating the contents thereof, means for admitting gaseous ethylene under high pressure, and means for evacuating or removing the contents thereof is charged with 75 parts of water, 25 parts of vinyl acetate, 3 parts of vinyl thiolacetate and 0.2 part of benzoyl peroxide. The vessel is pressured with ethylene and heating and agitation are started. During a reaction time of 16.25 hours, throughout which the temperature is maintained at 75° to 76° C., and the pressure at 850 to 950 atmospheres by periodically repressuring with ethylene, the total observed pressure drop is 700 atmospheres. After this period of reaction, agitation is discontinued, the pressure released to atmospheric by bleeding off excess ethylene, the reaction vessel opened, and the contents discharged. The reaction mixture is then steam-distilled, filtered, and the formed ethylene/vinyl thiolacetate/vinyl acetate polymer is dried in vacuum on a steam bath. There is thus obtained 46 parts of a polymer of ethylene with vinyl acetate and vinyl thiolacetate, which polymer has an intrinsic viscosity of 0.9 (as measured on a 0.125% solution in xylene at 85° C.). The polymer contains ethylene, vinyl acetate, and vinyl thiolacetate in the mole ratio of 112:6:1.

The above polymer is dissolved in toluene and saponified by heating and refluxing with one molecular equivalent of potassium hydroxide dissolved in methanol. During the heating period the polymer separates from the solvent, and is then filtered and dried. This hydrolyzed polymer is insoluble and is infusible at temperatures not higher than 250° C.

*Example 2.*—The apparatus of Example 1 is charged with 99 parts of water, one part of vinyl thiolacetate, and 0.2 part of benzoyl peroxide. The pH of this mixture is adjusted from 5.2 to 2.9 by the addition of dilute formic acid. The vessel is pressured with ethylene and heating and agitation are started. During a reaction time of 16.4 hours, throughout which the temperature is maintained at 75 to 76° C. and the pressure at 855 to 950 atmospheres by periodically repressuring with ethylene, there is a total pressure drop of 535 atmospheres. Upon letting down the pressure and recovering the mixed polymer produced, as in Example 1, the reaction mixture yields 35 parts of a polymer of ethylene with vinyl thiolacetate having an intrinsic viscosity of 1.55 (as measured on a 0.125% solution in xylene at 85° C.) and containing 0.22% sulfur. This polymer has an ethylene/vinyl thiolacetate mole ratio of 48:1. Pressed films of this polymer have good tear resistance and can be cold-drawn several hundred per cent without breaking.

*Example 3.*—The equipment of Example 1 is charged with 95 parts of water, 5 parts of vinyl thiolacetate and 0.2 part of benzoyl peroxide catalyst. The vessel is pressured with ethylene and heating and agitation are started. During a reaction time of 16.75 hours, throughout which the temperature is maintained at 74° to 76° C. and the pressure at 800 to 950 atmospheres by periodically repressuring with ethylene, there is a total observed pressure drop of 95 atmospheres. Upon cooling, letting down the pressure, and recovering the polymer as in Example 1, the reaction mixture yields 12 parts of an ethylene/vinyl thiolacetate polymer having an intrinsic viscosity of 0.84 (as measured on a 0.125% solution in xylene at 85° C.) and containing 3.1% sulfur. The polymer produced has an ethylene/vinyl thiolacetate mole ratio of 33:1. Pressed films of this polymer have high tear resistance, can be cold-drawn at least 550%, have a tensile strength of at least 1180 lbs. per sq. in. and an elongation at break of 240%.

*Example 4.*—The reaction vessel of Example 1 is charged with 98 parts of water, two parts of vinyl thiolacetate, and 0.2 part of benzoyl peroxide. The vessel is pressured with ethylene and heating and agitation are started. During a reaction time of 16.25 hours, throughout which the temperature is maintained at 74° to 75° C. and the pressure at 875 to 950 atmospheres by periodically repressuring with ethylene, there is a total observed pressure drop of 205 atmospheres. Agitation is terminated, the pressure is let down to atmospheric, and the polymer is recovered as in Example 1. From the reaction mixture there is recovered 18 parts of a polymer having an intrinsic viscosity of 0.84 (as measured on a 0.125% solution in xylene) and containing 2.6% sulfur. The polymer has an ethylene/vinyl thiolacetate mole ratio of 40:1. Pressed films of this polymer have good tear resistance and can be cold-drawn.

*Example 5.*—A stainless steel lined high pressure reaction vessel is charged with 100 parts of tertiary butyl alcohol, 10 parts vinyl thiolacetate, and 0.3 parts by volume of diethyl dioxide. The vessel is pressured with ethylene and heating and agitation are started. During a reaction time of 15.25 hours, throughout which the temperature is maintained at 100° to 105° C. and the pressure at 855 to 960 atmospheres by periodically repressuring with ethylene, there is a total observed pressure drop of 360 atmospheres. This reaction mixture yields 31 parts of an ethylene/vinyl thiolacetate polymer having a waxy feel and containing 8.8% sulfur. From this sulfur analysis it may be calculated that the polymer has an ethylene/vinyl thiolacetate mole ratio of 9.3:1.

*Example 6.*—A stainless steel lined high pressure reaction vessel is charged with 100 parts of tertiary butyl alcohol, 20 parts vinyl thiolacetate, and 0.3 parts (by volume) of diethyl dioxide. The vessel is pressured with ethylene and heating and agitation are started. During a reaction time of 17.25 hours, throughout which the temperature is maintained at 98° to 104° C. and the pressure at 875 to 990 atmospheres by periodically repressuring with ethylene, there is a total observed pressure drop of 175 atmospheres. This reaction mixture yields 19 parts of a waxy polymer having an intrinsic viscosity of 0.2 (as measured on a 0.5% solution of xylene at 85° C.) and containing 17.2% sulfur. From this sulfur analysis it may be calculated that the polymer has an ethylene/vinyl thiolacetate mole ratio of 3:1.

Although, as indicated hereinbefore, it is preferred to employ per-oxy compound catalysts, various other catalysts are known and may be employed. For example, oxygen when present in the ethylene in concentrations not in excess of 200 parts by weight per million acts as a catalyst at elevated temperatures, e. g., from about 150° to 250° C. Hydrazine derivatives such as hydrazine hydrochloride, dibenzoyl hydrazine, amine oxides and hexachloroethane also catalyze the reaction as do perhalogen compounds, and sodium-p-toluenesulfone-chloramide. Irradiation in the presence of photoactivators such as acetone, diacetyl, benzoin and metallic mercury may serve to catalyze the reaction. The thermodecomposition products of organometallic compounds such as tetra-alkyl leads may also serve to induce polymerization. Combinations of catalysts may be employed such as combinations of persulfates with organic per-oxygen compounds may also be employed.

Valuable insoluble and infusible polymers can be prepared from the polymers of the present invention by subjecting them to a controlled hydrolysis in contact with air. Thus, for example, films of polymers of ethylene with organic vinyl thiolesters can be treated with caustic potash in methanol solution to obtain hard, tough, insoluble and infusible films which remain infusible at temperatures as high as 250° C. Other appropriate hydrolysis procedures can be employed. Products which are initially soluble can be obtained by conducting the hydrolysis in the absence of air. Such solutions can then be cast to films which set up to infusible form on exposure to air.

Although batch operation of the process of the present invention has been illustrated and described, the process may also be advantageously carried out in a continuous manner. The high space-time yields of such processes make them particularly desirable especially on a commercial scale. A continuous process may be exemplified by the continuous passage of the whole polymerization mixture through a reaction zone maintained under appropriate polymerization conditions or by pumping the reactants separately through a mixing chamber, then through a reaction zone, or by pumping the reactants through a reaction zone while introducing a catalyst solution or suspension immediately prior to entering the reaction zone, which last method is preferable. In a continuous process, the catalyst solutions or suspensions may be introduced at intermediate stages throughout the reaction zone, since by this means the heat developed in any portion of the apparatus is relatively small and consequently the polymerization may be carried through to a desirably high molecular weight product. The present reaction is exothermic in character, and as in any process where the amount of heat to be removed is very large, a continuous process permits greater precision in control and consequently more uniformly excellent results.

Reference is here made to U. S. Serial No. 383,556 filed March 15, 1941 of which the present case is in part a continuation.

It will be apparent that the present invention provides novel, sulfur-containing, polymers of ethylene with organic vinyl thiolesters and, if desired, with a minor amount of a third polymerizable component. Aside from their own valuable uses in the arts, the polymers of the present invention are especially suitable for conversion into infusible and insoluble coatings or other forms by subjecting them to a controlled hydrolysis.

Since many apparently widely different embodiments will be apparent to one skilled in the art, it will be obvious that various changes may be made in the detailed practice of the invention without departing from the spirit and scope thereof.

What is claimed is:

1. A polymer of ethylene with a vinyl thiolester of an organic carboxylic acid.

2. A polymer of ethylene with a vinyl thiolester of an aliphatic carboxylic acid.

3. A polymer of ethylene with vinyl thiolacetate.

4. A polymer of ethylene with vinyl thiolpropionate.

5. A polymer of ethylene with vinyl thiolbutyrate.

6. A polymer of ethylene with a vinyl thiolester of an organic carboxylic acid and a minor amount of a third polymerizable compound containing ethylenic unsaturation.

7. A polymer of ethylene with a vinyl thiolester of an organic carboxylic acid and not more than 10 mole per cent, based on total polymer present, of methyl methacrylate.

8. An insoluble, hydrolyzed polymer of ethylene with a vinyl thiolester of an organic carboxylic acid, said insoluble polymer being infusible at temperatures not higher than 250° C.

9. A polymer comprising at least 75 mole per cent ethylene and not more than 25 mole per cent vinyl thiolacetate.

10. A polymer comprising from 1 to 99 mole per cent ethylene and from 99 to 1 mole per cent of a vinyl thiolester of an aliphatic carboxylic acid.

11. A polymer comprising ethylene, at least 0.5 mole per cent of a vinyl thiolester of an aliphatic carboxylic acid, and not more than 10 mole per cent of another polymerizable compound containing ethylenic unsaturation.

12. A polymer comprising at least 75 mole per cent ethylene and not more than 25 mole per cent of a vinyl thiolester of an aliphatic carboxylic acid.

13. A polymer comprising from 1 to 99 mole per cent ethylene and from 99 to 1 mole per cent of vinyl thiolacetate.

14. The process for preparing a polymer of ethylene with a vinyl thiolester of an organic carboxylic acid which comprises subjecting an intimate mixture of ethylene and a vinyl thiolester of an organic carboxylic acid to a temperature of at least 20° C. and under a superatmospheric pressure in the presence of a per-oxy compound polymerization catalyst.

15. The process for preparing a polymer of ethylene with a vinyl thiolester of an aliphatic carboxylic acid which comprises subjecting an intimate mixture of ethylene and a vinyl thiolester of an aliphatic carboxylic acid to a temperature between 40° C. and 350° C. and under a superatmospheric pressure in the presence of a per-oxy compound polymerization catalyst.

16. The process for preparing a polymer of ethylene with vinyl thiolacetate which comprises subjecting an intimate mixture of ethylene and vinyl thiolacetate to a temperature between 40° C. and 180° C. and under a superatmospheric pressure in excess of 4 atmospheres in the presence of a per-oxy compound polymerization catalyst and an aqueous menstruum.

17. The process which comprises introducing into a closed stainless steel lined reaction vessel a mixture comprising about 20 parts by weight vinyl thiolacetate and about 0.3 part by weight diethyl peroxide dissolved in about 100 parts by weight tertiary butyl alcohol, heating the reaction mixture to a temperature of about 98° C. to 104° C., pressing gaseous ethylene into the said vessel, agitating the reaction mixture during a reaction time of about 17.25 hours while maintaining the pressure on the reaction mixture at 875 to 990 atmospheres by periodic addition of ethylene, cooling and releasing the pressure on the mixture, and recovering about 19 parts by weight of a polymer of ethylene and vinyl thiolacetate having a molar ratio of 3 moles of ethylene to one mole of vinyl thiolacetate.

18. The process which comprises introducing into a closed stainless steel-lined reaction vessel a mixture comprising about 1 part by weight vinyl thiolacetate and about 0.2 part by weight benzoyl peroxide in about 99 parts by weight water, acidifying the mixture with formic acid to a pH of about 2.9, pressing gaseous ethylene into the said vessel to a pressure of about 855 to 950 atmospheres, agitating the reaction mixture while maintaining its temperature at about 75° C. to 76° C. over a period of about 16.4 hours, maintaining the ethylene pressure at about 855 to 950 atmospheres during said heating and agitation by admitting further quantities of ethylene, and thereafter cooling, releasing the pressure, and recovering about 35 parts by weight of a mixed polymer of ethylene with vinyl thiolacetate containing about 0.22% sulfur by weight and capable of being cold-drawn to at least 200% of original length when in film form.

19. The polymer of ethylene with vinyl thiolacetate and not more than 10 mole per cent of vinyl acetate.

20. The process for preparing a polymer of ethylene with a vinyl thiolester of an organic carboxylic acid which comprises subjecting an intimate mixture of ethylene and a vinyl thiolester of an organic carboxylic acid to an elevated temperature of about 150 to 250° C. and under superatmospheric pressure in the presence of not more than about 200 parts gaseous oxygen catalyst per million parts ethylene by weight.

21. A polymer of ethylene with a vinyl thiolester of an organic carboxylic acid and a minor amount of vinyl acetate.

MERLIN MARTIN BRUBAKER.